United States Patent [19]

Nagao

[11] Patent Number: 4,589,262

[45] Date of Patent: May 20, 1986

[54] ABSORPTION TYPE AIR CONDITIONING SYSTEM

[75] Inventor: Masaji Nagao, Ibaraki, Japan

[73] Assignee: Hitachi, Ltd., Tokyo, Japan

[21] Appl. No.: 759,878

[22] Filed: Jul. 29, 1985

[30] Foreign Application Priority Data

Jul. 27, 1984 [JP] Japan ................................ 59-155264

[51] Int. Cl.$^4$ ........................................... F25B 15/00
[52] U.S. Cl. ........................................ 62/141; 62/148;
62/238.3; 62/239; 62/243; 62/476
[58] Field of Search ...................... 62/239, 243, 238.3,
62/476, 141, 148

[56] References Cited

U.S. PATENT DOCUMENTS 4,253,310 3/1981 Sokolov ............................ 62/243 X
4,439,999 4/1984 Mori et al. ........................ 62/238.3
4,523,631 6/1985 McKinney ...................... 62/238.3 X

*Primary Examiner*—Lloyd L. King
*Attorney, Agent, or Firm*—Antonelli, Terry & Wands

[57] ABSTRACT

An absorption type chiller/heater unit is actuated to generate cold water for air cooling and hot water for heating and/or hot water supply by utilizing, as a heating source, the exhaust gas from an internal combustion engine and the cooling water heated in and delivered from the water jacket. When generating the hot water for heating and/or hot water supply, the temperature of the engine cooling water delivered from the heat exchanger for heating and hot water supply is raised by a water heater to an appropriate level for the cooling of the internal combustion engine.

7 Claims, 2 Drawing Figures

ABSORPTION TYPE AIR CONDITIONING SYSTEM

BACKGROUND OF THE INVENTION

This invention relates to an absorption type air conditioning system in which an engine and an absorption type chiller and cooler are combined.

The specification of U.S. Pat. No. 4,439,999 discloses absorption type chiller which is operated by heat derived from the exhaust gas of an engine as well as from cooling water heated in the cylinder jacket of the engine.

This prior art literature discloses only an absorption type chiller and does not describe a system in which an engine and an absorption type/chiller heater are combined. The inlet temperature of the cooling water for an engine is generally higher than the temperature required for warm water used for a heating and hot water supply. Accordingly, when the engine cooling water is returned to the engine after being utilized as a heating source for heating and hot water supply, the temperature of the water becomes lower than the temperature necessary for cooling the engine, thus overcooling the engine and adversely affecting the engine operation.

SUMMARY OF THE INVENTION

Accordingly it is an object of the invention to provide an absorption type air conditioning system which enables maintenance of a desired constant temperature of the engine cooling water returning to the cooling water jacket of an engine.

It is another object of the invention to provide an absorption type air conditioning system which enables cooling, heating and hot water supply by utilizing the exhaust gas expelled from an engine and the cooling water which is heated in the jacket (hereinunder referred to as "heated cooling water").

This invention is characterized in that an absorption type air conditioning system includes a water heater, a heat exchanger for heating and hot water supply, a heat exchanger for radiation, and a control valve for controlling the ratio as between the flow rate of the engine cooling water which flows into the heat exchanger for radiation and the flow rate of the engine cooling water which flows into the heat exchanger for heating and hot water supply, as well as an absorption type chiller and heater having first, second and third generators, a condenser, an evaporator, an absorber, and a heat exchanger; and in that the exhaust gas of the engine is utilized as the heating source for the first generator, and the engine cooling water of the engine as the heating source for the second generator; the engine cooling water delivered from the second generator is supplied to both heat exchangers for radiation and for warming and hot water supply in parallel; the engine cooling water delivered from these heat exchangers are introduced to the water heater; the water heater raises the engine cooling water up to a constant predetermined temperature by refrigerant vapor which is generated by the first generator; and thereafter the engine cooling water is returned to the engine.

The above and other objects, features and advantages of the present invention will become clear from the following description of the preferred embodiments thereof, taken in conjunction with the accompanying drawings.

DESCRIPTION OF THE PREFERRED EMBODIMENT

Figure 1:
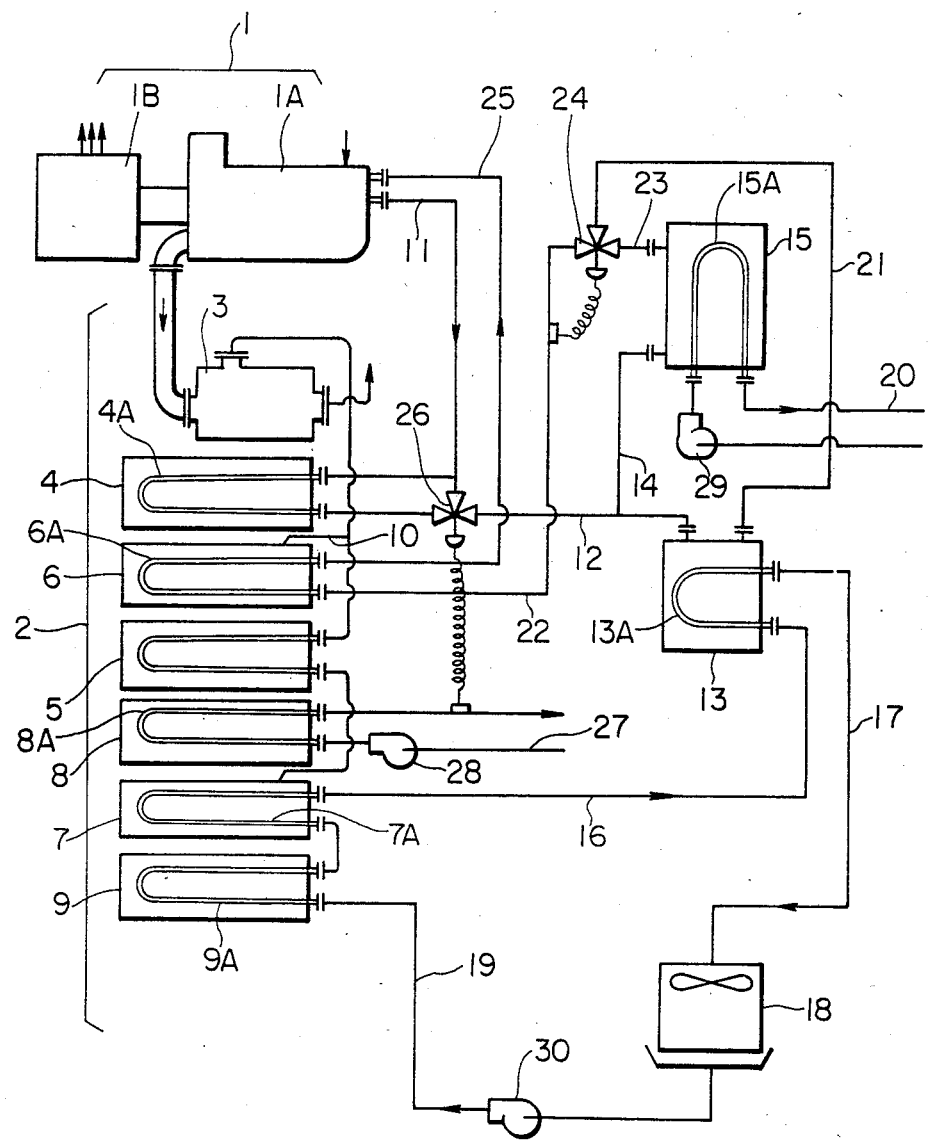
FIG. 1 is a flow diagram of an embodiment of the invention.

An engine unit 1 has an engine 1A which produces power on the supply of fuel, and a dynamo 1B which is driven by the engine 1A to produce electric power. An absorption type chiller/heater unit 2 includes a first generator 3 the heating source of which is the exhaust gas of the engine 1A, a second generator 4 the heating source of which is the engine cooling water in the water jacket of the engine 1A, a third generator 5, a water heater 6, a condenser 7, an evaporator 8, an absorber 9 and a heat exchanger (not shown). The water heater 6 has a tube 6A which is connected to the first generator 3 through a refrigerant circulation passage 10, and the medium which passes through the passage 10 is heated by the refrigerant vapor which is taken out of the first generator through the passage 10. The other elements of the absorption type chiller and heater 2 have the same structures as those described in U.S. Pat. No. 4,439,999.

The inlet of the heating pipe 4A of the second generator 4 is connected to the cooling water jacket of the engine 1A through a conduit 11. The outlet of the heating pipe 4A of the second generator 4 is connected to a conduit 12 through which a heat exchanger for radiation 13, a conduit 14 which is branched from the conduit 12, and a heat exchanger for heating and hot water supply 15 is connected to the outlet of the heating pipe 4A. The heat exchanger for radiation 13 contains a tube 13A and the heat exchanger for heating and hot water supply 15 a tube 15A. The inlet of the tube 13A of the heat exchanger for radiation 13 is connected to the outlet of the tube 7A of the condenser 7 through a conduit 16 and the outlet thereof is connected to the inlet of a cooling tower 18 through a conduit 17. The outlet of the cooling tower 18 is connected to the inlet of the tube 9A of the absorber 9. The outlet of the tube 9A of the absorber 9 is connected to the inlet of the tube 7A of the condenser 7. A conduit 20 for introducing hot water for heating and hot water supply is connected to the tube 15A of the heat exchanger for heating and hot water supply 15. The outlet of the heat exchanger for radiation 13 is connected to the inlet of the tube 6A of the water heater 6 through conduits 21 and 22, and the outlet of the heat exchanger for heating and hot water supply 15 is connected to the inlet of the tube 6A of the water heater 6 through conduits 23 and 22. A second three-way control valve 24 is disposed at the joint of the conduits 21, 22 and 23. The outlet of the tube 6A of the water heater 6 is connected to the inlet of the water jacket of the engine 1A through a conduit 25. The conduits 11 and 12 which are connected to the inlet and the outlet, respectively, of the second generator 4 are connected by a first three-way control valve 26. The evaporator 8 has a tube 8A, to the inlet and the outlet of which is connected a cold water circulation conduit 27. The referential numerals 28, 29 and 30 denote feed liquid pipes.

The operation will next be explained.
Air Cooling Mode Operation:

The exhaust gas exhausted from the engine 1A is supplied to the first generator 3 through an exhaust duct. The exhaust gas generates refrigerant vapor by heating the aqueous lithium bromide in the first generator 3 and the exhaust gas from which the heat has been absorbed is emitted to the atmosphere.

On the other hand, the engine cooling water discharged from the water jacket of the engine 1A is supplied to the second generator 4 through the conduit 11, and the engine cooling water from which the heat has been carried away is introduced to the first three-way control valve 26 of the conduit 12. The first three-way control valve 26 detects the outlet temperature of the cold water which passes through the cold water circulation passage 27 and controls the engine cooling water which passes through the conduit 12. That is, when the air cooling load is low, the control valve 26 controls the ratio between the flow rate of the engine cooling water which is supplied to the second generator 4 and the flow rate of the engine cooling water which is introduced to the conduit 12 by bypassing the second generator 4.

Since the engine cooling water must be returned to the engine 1A after discharge of a constant quantity of heat, the flow rate of the engine cooling water which passes the heat exchanger for radiation 13 is controlled by the second three-way control valve 24 if adequate heat has not been discharged in the second generator 4 due to some cause related to air cooling load. As a result the temperature of the engine cooling water comes down to a predetermined level suitable for the cooling of the engine 1A and is introduced to the water heater 6 through the conduit 21, the second three-way control valve 24 and the conduit 22. Thereafter the engine cooling water is returned to the engine 1A through the conduit 25.

In this case, since the absorption type chiller/heater unit 2 is driven in the air cooling mode, the temperature within the water heater 6 is low, and the engine cooling water from the jacket is so controlled as to have a predetermined temperature by the second three-way control valve 24. The engine cooling water is therefore returned to the engine 1A without making any heat exchange within the water heater 6. The heat exchanger 15 for heating and hot water supply bears only the load of hot water supply during cooling operation. Since the load of hot water supply is usually low, there is no risk of disturbing the air cooling system. In other words, though the load for hot water supply may temporarily increase, it is immediately restored to its original state and when the air cooling load is not greater than 100%, the quantity of heat which is bypassed by the first three-way valve is used for hot water supply.

When the air cooling load is reduced, the bypassing rate increases by means of the first three-way control valve 26, and when the air cooling load is reduced even more, the heat which is received from the exhaust gas in the first generator 3 is in surplus. In this case, the surplus heat is emitted to the cooling water side through the absorber 9 and the condenser 7 in the absorption type chiller/heater unit 2. In this embodiment, therefore, the first three-way control valve 26 is able to act regardless of the reduction of air cooling load. In addition, this embodiment also enables operation when there are both air cooling and heating loads as during the intermediate period.

Heating Mode Operation:

In a case where there is a heating and hot water supply load but no air cooling load, the mode of the absorption type chiller and heater 2 is manually or automatically changed over to the heating mode. In the heating mode, the entire amount of engine cooling water is bypassed by the first three-way control valve 26 and is introduced to the heat exchanger for radiation 13 and the heat exchanger for heating and hot water supply 15 through the conduits 12 and 14, without flowing into the second generator 4. The engine cooling water is next introduced to the water heater 6 through the conduits 21, 23 and 22 while the temperature of the engine cooling water and the heating and hot water supplying load are controlled by the second three-way control valve 24.

In the heating mode, the heat of the exhaust gas introduced into the first generator 3 is transferred to the engine cooling water by the water heater 6. In other words, the exhaust gas heats the aqueous lithium bromide in the first generator 3 to generate refrigerant vapor and thereafter it is emitted to the atmosphere. The refrigerant vapor generated in the first generator 3 flows into the water heater 6 through the conduit 10, and heats the engine cooling water which is in the tube 6A. The engine cooling water which is to return to the engine 1A is thereby heated to an appropriate temperature for cooling the engine 1A.

When the heating and hot water supplying load is low, the quantity of heat which is emitted from the heat exchanger 13 to the cooling tower 18 increases while when the heating and hot water supplying load increases, the quantity of heat which is emitted from the heat exchanger 13 to the cooling tower 18 decreases.

Figure 2:
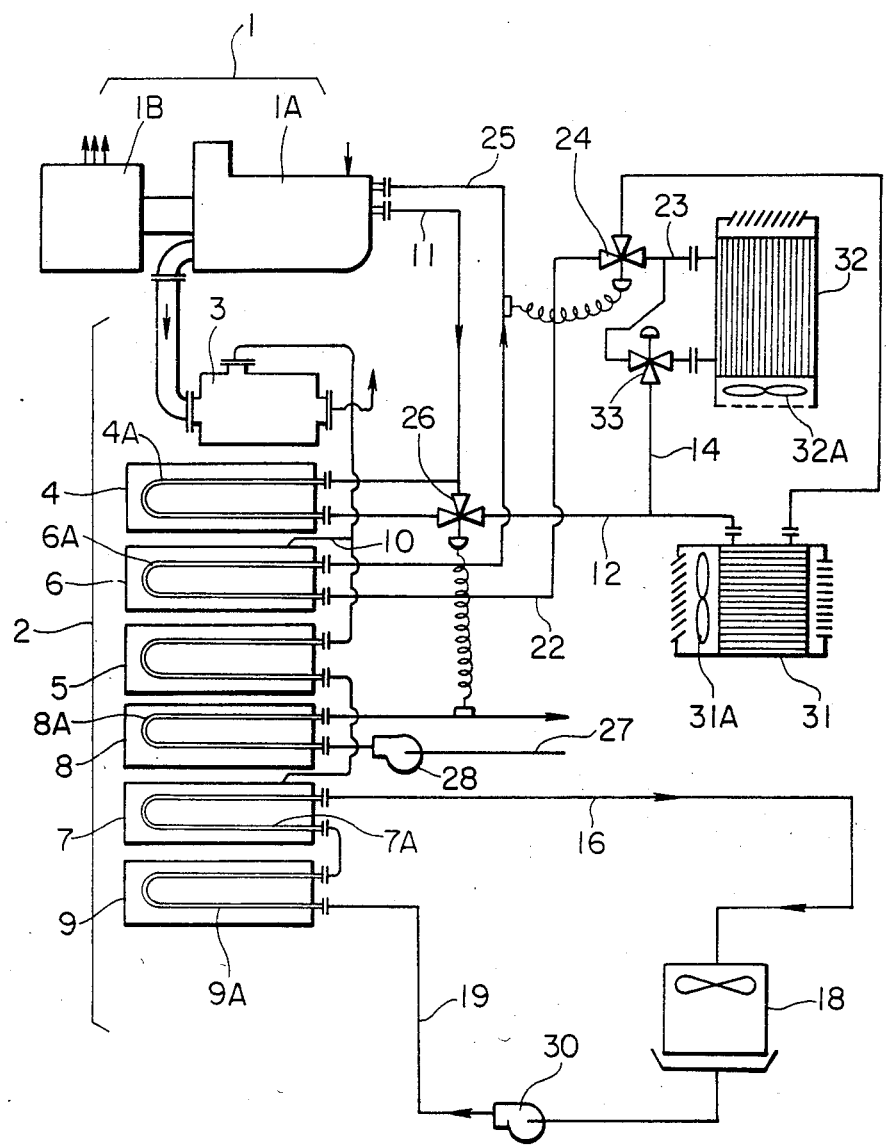
FIG. 2 is a flow diagram of another embodiment of the invention.

FIG. 2 shows a second embodiment of the invention. In this embodiment, the first embodiment is modified in such a manner that the heat exchanger 13 for radiation is replaced by a radiator 31 which radiates heat directly into the atmosphere, the heat exchanger for heating and hot water supply 15 is replaced by a heating air conditioner 32, and the conduits 14 and 23 are connected by a three-way change-over valve 33 and a conduit 34. The radiator 31 and the air conditioner 32 are provided with the respective fans 31A and 32A. The second three-way control valve 24 is controlled by the temperature of engine cooling water in the conduit 25. The outlet of the tube 7A of the condenser 7 is connected to the cooling tower 18 through the conduit 16.

The engine cooling water is introduced from the engine 1A to the second generator 4 through the conduit 11. In the case of air cooling operation of this second embodiment, the heat of the engine cooling water which has not been absorbed in the second generator 4 is emitted to the cooling air in the radiator 31 by controlling the flow rate of the engine cooling water which passes through the radiator 31 by the second three-way control valve 24, whereby the temperature of the engine cooling water is lowered to a constant predetermined temperature appropriate for being returned to the engine 1A. At this time the three-way change-over valve 33 is maintained in the state in which the entire amount of the engine cooling water bypasses the air heater 32. From the same reason as in the first embodiment, there is no heat flow in the warm heater 6.

In the second embodiment, hot water supply is not conducted during air cooling or heating, nor are air cooling and heating operated at the same time, and changeover from the cooling air-cooling mode to the air heating mode is conducted automatically or manually.

In heating mode operation, since the first three-way control valve 26 bypasses the entire amount of the engine cooling water, no water passes through the second generator 4. At this time, the three-way change-over valve 33 passes the whole amount of engine cooling water to the air heater 32. Accordingly warm air is discharged from the air heater 32 in accordance with the heating load. When the heating load is lowered, the second three-way control valve 24 controls the heat which is absorbed in the radiator 31. The heat which is transferred to the absorption type chiller/heater unit 2 by the first generator 3 is transferred from the water heater 6 to the engine cooling water. Thus, the temperature of the engine cooling water which has passed the water heater 6 has been raised to a constant predetermined level appropriate for cooling the engine 1A, before the cooling water is returned to the engine 1A. In this way one heating mode is completed.

According to the second embodiment, it is possible to pass the cold water which is generated by the evaporator 8 to the air heater 32 during heating as well as during air cooling by attaching the three-way change-over valve 33 to the air heater 32 and connecting a conduit 27 to the air heater 32 by a switching system.

While there has been described what are at present considered to be the preferred embodiment of the invention, it will be understood that various modifications may be made thereto, and it is intended that the appended claims cover all such modifications as fall within the true spirit and scope of the invention.

What is claimed is:

1. An absorption type air conditioning system comprising:
   an internal combustion engine having an exhaust gas duct and a water jacket;
   an absorption type chiller/heater unit having a first generator the heating source of which is the exhaust gas of said internal combustion engine, a second generator the heating source of which is the cooling water heated in said water jacket, a condenser, an evaporator, an absorber and a water heater;
   a heat exchanger for radiation which radiates heat into the atmosphere;
   a heat exchanger for generating hot water for heating and/or hot water supply;
   a cooling tower for emitting the heat of said condenser and said absorber into the atmosphere;
   a engine cooling water circulation passage which is so composed as to pass said engine cooling water delivered from said water jacket of said internal combustion engine through said absorption type chiller/heater unit after passing said second generator, said heat exchanger for radiation and said heat exchanger for heating and/or hot water supply; and
   first and second control valves disposed in said engine cooling water circulation passage.

2. An absorption type air conditioning system according to claim 1, wherein said first control valve is a three-way control valve which is so disposed as to connect the engine cooling water inlet side and the engine cooling water outlet side of the tube of said second generator and which controls the flow rate of said engine cooling water which is bypassed from said engine cooling water inlet side to said engine cooling water outlet side of said tube in accordance with the temperature of the cold water which is generated by said evaporator.

3. An absorption type air conditioning system according to claim 1, wherein said second control valve is a three-way control valve which is disposed at the joint of the engine cooling water outlet side of said heat exchanger for radiation, the engine cooling water outlet side of said heat exchanger for heating or/and hot water supply, and the heated water inlet side of said water heater, and which detects the temperature of said engine cooling water which flows into said water heater and controls the flow rate of said engine cooling water such that the detected temperature of said cooling water has a constant level.

4. An absorption type air conditioning system according to claim 1, wherein said heat exchanger for radiation has a tube in which the cooling water circulating through said cooling tower, said absorber and said condenser is circulated, whereby the heat of said engine cooling water flowing through said heat exchanger for radiation is discharged to the atmosphere through said cooling tower.

5. An absorption type air conditioning system according to claim 4, wherein the cooling water delivered from said condenser is introduced to said tube of said heat exchanger for radiation and is then introduced to said cooling tower.

6. An absorption type air conditioning system according to claim 1, wherein said heat exchanger for radiation radiates to the atmosphere the heat of said engine cooling water flowing therethrough.

7. An absorption type air conditioning system according to claim 1, wherein said heat exchanger for heating and/or hot water supply radiates to the atmosphere the heat of said engine cooling water flowing therethrough.

* * * * *